No. 752,013. PATENTED FEB. 9, 1904.
S. F. WEBB.
ANIMAL POKE.
APPLICATION FILED JULY 14, 1903.
NO MODEL.
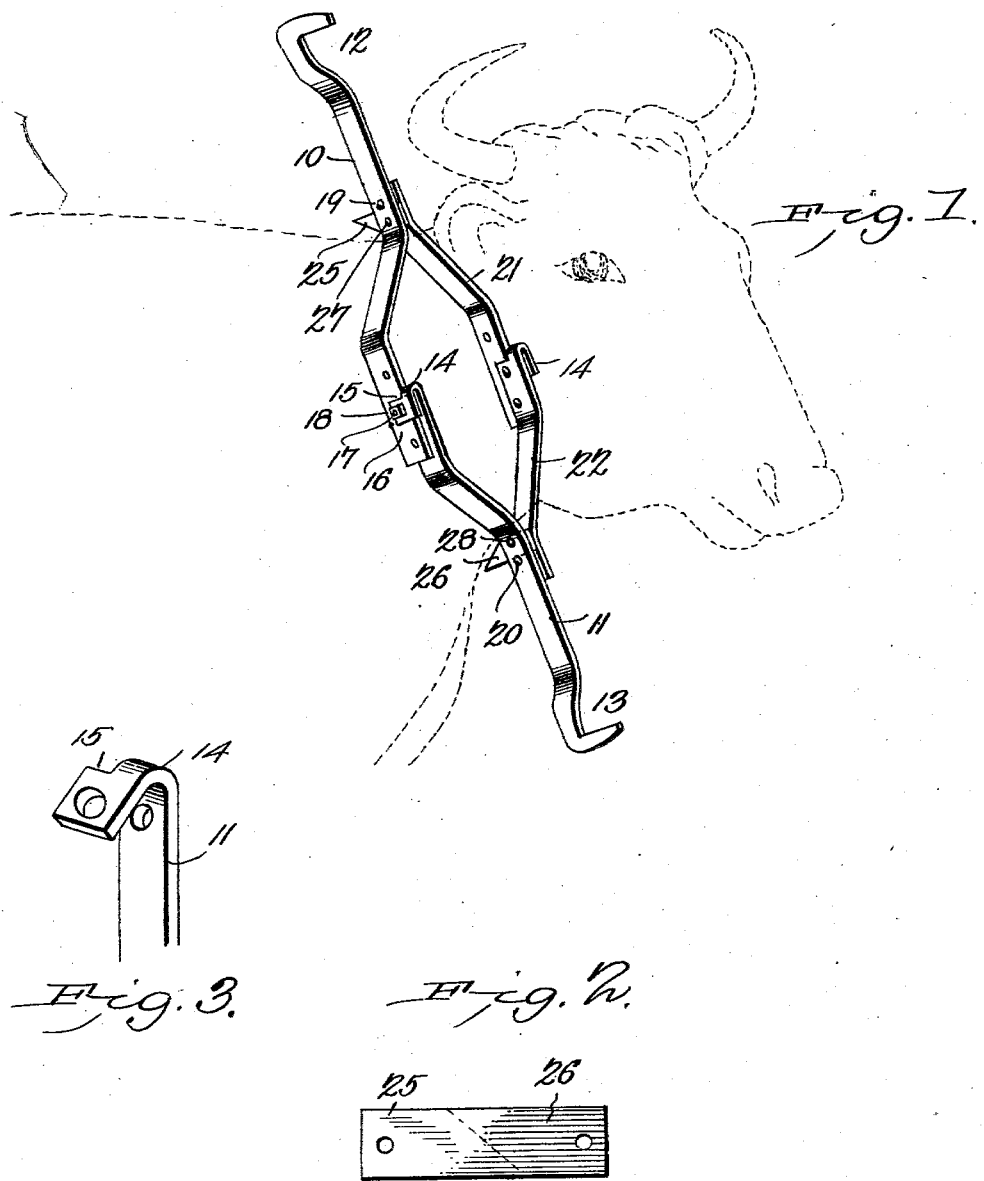

No. 752,013. Patented February 9, 1904.

UNITED STATES PATENT OFFICE.

SAMUEL F. WEBB, OF WICHITA, KANSAS, ASSIGNOR TO C. W. DUNAWAY, OF WICHITA, KANSAS.

ANIMAL-POKE.

SPECIFICATION forming part of Letters Patent No. 752,013, dated February 9, 1904.

Application filed July 14, 1903. Serial No. 165,468. (No model.)

*To all whom it may concern:*

Be it known that I, SAMUEL F. WEBB, a citizen of the United States, residing at Wichita, in the county of Sedgwick and State of Kansas, have invented a new and useful Animal-Poke, of which the following is a specification.

This invention relates to that class of devices employed upon "breechy" cattle to prevent them from forcing their way through fences or other similar barriers, and has for its object to simplify and improve devices of this character and cheapen the construction and increase the efficiency; and the invention consists in certain novel feature of construction, as hereinafter shown and described, and specified in the claim.

In the drawings illustrative of the invention, in which corresponding parts are denoted by like designating characters, Figure 1 is a perspective view of the device. Fig. 2 is a diagrammatic view illustrating the manner of forming the spurs. Fig. 3 is an enlarged detail of the joint, illustrating its construction.

The improved device consists of primary bars 10 11, having lateral hooks 12 13 at their outer ends and with their inner ends jointed, the joint being formed by folding the end 14 of the bar 11 over upon itself, with a recess 15 at the folding-point, and inserting the end 16 of the bar 10 through the recess and in the rear of the end 14 and connecting the parts by a pivot-bolt 17. By this means the bars are free to turn in one direction, but will be stopped by the bottom of the recess from moving beyond a certain point in the opposite direction.

By "setting up" the nut 18 on the bolt 17 the joint may be tightened to any desired extent, so that it will not move too freely.

The bars 10 11 are bowed, as shown, to fit one side of the neck of the animal, and the bar 10 will be provided with a plurality of apertures for the bolt 17 to provide for adjustment for different-sized animals.

Attached to the primary bars 10 11, as by rivets 19 20, are secondary bars 21 22, jointed centrally in the same manner as the bars 10 11 are jointed and united by pivot-bolt nut and bowed reversely to the bars 10 11 to correspond to the other side of the animal's neck, as shown.

The rivets 19 20 are spaced from the outer bends of the bars 10 11 and 21 22, and between these rivets and the opening for the animal's neck spurs 25 26 are secured, as by rivets 27 28, respectively, the spurs extending laterally to the bars and reversely to the hooks 12 13, as shown.

The inner faces of the spurs 25 26 are inclined outwardly, as shown, so that they will not "prod" the animal so long as the connected bars are not folded together or bent at their central joints. The spurs 25 26 are thus supported by the same rivets which assist in uniting the bar members, thereby not only economizing in the use of rivets, but also materially strengthening the coupling between the parts, as will be obvious.

When the device is adjusted to the neck of the animal, the hooks 12 13 will point forwardly and the spurs 25 26 rearwardly, with their inclined sides toward the animal, and so long as no attempt is made to thrust the head through the wires of a fence or other similar barrier the poke will remain non-operative and will not interfere with the natural movements of the animal; but any attempt to thrust the head through the fence will cause one or both of the hooks to catch on the wires or other obstruction, and thus double the connected bars 10 21 or 11 22 rearwardly and prod the animal with the spurs 25 26 and force a retreat. As soon as the pressure is removed the parts return to their former position, as will be obvious.

The devices will be constructed, preferably, of steel and can be manufactured cheaply and strongly and will be furnished in graded sizes to fit all sizes and species of animals to which they are applicable.

The spurs will preferably be cut from a single piece, as represented in Fig. 2, to prevent waste of material.

The portions 14 will not be bent quite parallel to the body portions 11 and 22, as indicated in Fig. 3, but will be clamped "home" into close engagement with the members 16 by the clamp-bolts, thus insuring a constant outward pressure against the nuts to prevent them turning backwardly and becoming loosened by the jarring to which the device is subjected when in use.

The parts will preferably be of steel, and the portions 14 thus exert a constantly-acting spring force against the nuts and prevent backward motion thereto, as will be obvious.

Having thus described the invention, what I claim is—

An animal-poke comprising primary bars having lateral hooks at the outer ends and bowed to fit one side of the neck of the animal, secondary bars connected by their outer ends to said primary bars and bowed to fit the opposite side of the neck of the animal, the inner ends of one of said primary bars and of one of said secondary bars being turned over at an angle to the body of the bars and provided with transverse apertures and with recesses extending partially through the bars at their bends to form sockets to receive the apertured free ends of the other primary and secondary bars, and clamp-bolts passing through said apertures and having nuts adapted to compress said folded portions and be locked from reverse movement by the resiliency thereof, substantially as specified.

In testimony that I claim the foregoing as my own I have hereto affixed my signature in the presence of two witnesses.

SAMUEL F. WEBB.

Witnesses:
E. C. BLANCHARD,
S. D. HUFF.